United States Patent [19]

DeStefano

[11] Patent Number: 4,934,404
[45] Date of Patent: Jun. 19, 1990

[54] WATER MANAGEMENT SYSTEM

[76] Inventor: Gerard DeStefano, 2629 Del Prado Blvd., Cape Coral, Fla. 33904

[21] Appl. No.: 398,970

[22] Filed: Aug. 28, 1989

[51] Int. Cl.$^5$ ............................................. E04D 13/00
[52] U.S. Cl. ................................ 137/357; 137/236.1; 137/566; 239/310
[58] Field of Search ................... 239/208-209, 239/200, 310-318, 289; 52/169.5, 16; 137/357, 236.1, 566, 567, 568

[56] References Cited

U.S. PATENT DOCUMENTS

| | | | |
|---|---|---|---|
| 2,763,281 | 9/1956 | Morgan | 137/566 |
| 3,542,055 | 11/1970 | Belart | 137/255 |
| 3,771,968 | 11/1973 | Stalnaker | 239/310 |
| 3,833,177 | 9/1974 | Pasley et al. | 239/310 |
| 4,034,421 | 7/1977 | Pihl et al. | 137/566 |
| 4,161,186 | 7/1979 | Sitarz | 137/357 |
| 4,269,352 | 5/1981 | Przystawik | 137/566 |
| 4,726,151 | 2/1988 | Vitale | 52/16 |

Primary Examiner—A. Michael Chambers
Attorney, Agent, or Firm—William E. Noonan

[57] ABSTRACT

A water management system is disclosed including a receptacle that is mounted to the roof of a building for collecting water runoff from the roof. There is an underground reservoir and a first conduit interconnects the receptacle and the reservoir for conducting runoff from the receptacle to the reservoir for storage therein. A second conduit is connected to the reservoir forming an outlet therefrom. The stored water is pumped out of the reservoir to the second conduit and is dispensed to irrigate a predetermined region.

11 Claims, 2 Drawing Sheets

WATER MANAGEMENT SYSTEM

FIELD OF INVENTION

This invention relates to a water management system and more particularly to a system for collecting and storing rain water from building roofs and later recycling that water for agricultural use.

BACKGROUND OF INVENTION

Various regions throughout the world are subject to sharply defined seasons wherein the rain or snowfall during certain wet months far exceeds the precipitation which falls during dry periods. The resulting water shortages which occur during the dry months are particularly acutely felt in places such as Florida and California where agriculture is a year round industry and where a constant source of water for irrigation is required. During recent years, excessively hot, dry summers have devastated many farming regions both in the United States and around the world. This problem is particularly frustrating because much of the excess rain which falls during the wet periods evaporates or otherwise dissipates and is never used. A need has therefore arisen for a water management system which permits the storage of excess water that accumulates during the wet or rainy season for subsequent use in agricultural irrigation during the ensuing dry season.

SUMMARY OF THE INVENTION

It is therefore an object of this invention to provide a water management system which effectively collects water from the roofs of commercial and residential buildings and efficiently stores that collected water for subsequent agricultural use.

It is a further object of this invention to provide a water management system that effectively collects water during the rainy season for subsequent agricultural use during the dry season.

It is a further object of this invention to provide a water management system that prevents excessive loss of stored water through leakage and evaporation.

It is a further object of this invention which permits fertilizer and agricultural nutrients to be conveniently added to the stored water.

It is a further object of this invention to provide a relatively uncomplicated water management system that requires minimal effort and expense to maintain and operate.

This invention features a water management system including receptacle means mounted to the roof of a building for collecting water runoff from the roof. There are underground reservoir means and first conduit means interconnecting the receptacle means and the reservoir means for conducting the water runoff from the receptacle means to the reservoir means for storage therein. There are second conduit means connected to the reservoir means for forming an outlet therefrom. There are means for pumping stored water out of the reservoir means to the second conduit means and means are connected to the second conduit means for dispensing the pumped water to irrigate a predetermined region.

In a preferred embodiment the receptacle means may include a rain gutter and the reservoir means may include either one or a plurality of tanks. The reservoir means may include liner means to restrict leakage of the stored water from the reservoir means. Such liner means may include at least one vinyl liner.

The means for pumping may be supported by an upper wall of the tank. Alternatively, the means for pumping may be disposed below the tank or above the surface. Such means for pumping may include one or more pumps.

Means may be provided for introducing fertilizer into the stored water. Such means for introducing may include an inlet element that is attached to the first conduit means. The first conduit means may be formed of discrete sections and the inlet element may be integrally connected to one of the discrete sections of the first conduit means at an angle such that the inlet element and the attached suction of the first conduit means form a generally Y-shaped member.

BRIEF DESCRIPTION OF THE DRAWINGS

Other objects, features and advantages will occur from the following description of preferred embodiments and the accompanying drawings, in which.

DETAILED DESCRIPTION OF PREFERRED EMBODIMENTS

Figure 1:
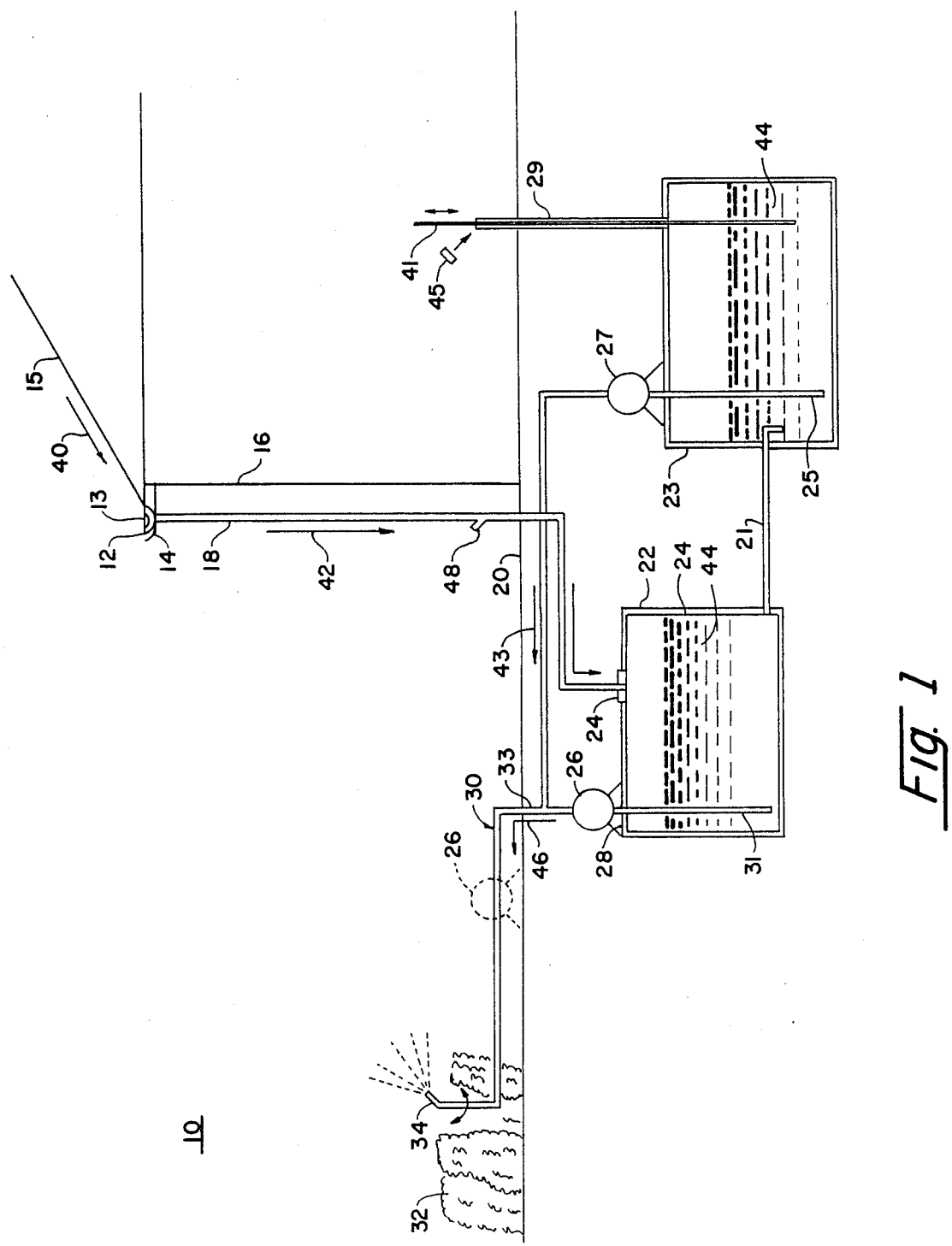
FIG. 1 is a diagrammatic view of a preferred water management system according to this invention.

A water management system according to this invention may be accomplished by utilizing a conventional rain gutter that is mounted to either a commercial or a residential building. The gutter may be mounted either to a flat or a pitched roof. A first conduit means, typically comprising a downspout, is directed from the gutter and into an underground storage reservoir. The reservoir may comprise one or more tanks. It is preferred that a liner composed of vinyl or similar material be formed against some or all of the walls of each tank. This prevents leakage of the stored water from the tank and distinguishes the tank from a conventional septic type tank wherein water leakage is an expected and desired feature.

An inlet is provided for introducing fertilizers into the subterranean storage reservoir. This operation is facilitated by forming the inlet element integrally into the downspout at a point sufficiently close to the ground so that the operator may simply add the desired fertilizer through the inlet without a ladder. The fertilizer is then carried by the conducted water into the storage reservoir. A cap may be provided for covering the inlet element after the fertilizer is added.

Various types of known pumps may be employed for drawing the stored water out of the reservoir when needed. This pumped water is directed by a second conduit system to a water dispensing mechanism which distributes the stored water over a predetermined area to be irrigated. The dispensing mechanism may include various types of sprinklers, sprayers and other devices known in the agricultural industry.

The materials that are used for the conduit means should be sturdy, long lasting and both rust and fertilizer resistant. PVC and similar materials are preferred. The pump should also be rugged and relatively maintenance free, particularly when the pump is buried beneath the ground. The walls of the storage reservoir should likewise be capable of sustaining an extended period beneath the ground. The use of a tough vinyl that is resistant to corrosion by water and fertilizing materials is also preferred for the liner.

This water management system enables rain water and melted snow to be effectively collected, stored, and then utilized when needed for agricultural purposes. Rooftop water runoff, which has heretofore been largely wasted, is put to a unique and beneficial use. And the water is delivered directly from the rooftop to the irrigation site without requiring the transport of large containers. This efficiency makes the system particularly suited to areas which experience extended dry seasons.

Unlike prior irrigation systems, this water management system distinctively addresses the severe problem of extended dry seasons. Prior systems typically make use of lakes, rivers, wells and aquifers, where water losses through evaporation, seepage and runoff are great. In the present system the collected water is stored underground in an enclosed tank. As a result, it can be stored for extended periods without loss of the water into the ground through leakage or into the air through evaporation. The use of a liner further reduces such water loss. Virtually all of the rooftop water is captured for agricultural use. Prior irrigation systems do not permit such efficient use of collected water and certainly do not permit water that is collected from the roofs of buildings during the rainy season to be subsequently used during an ensuing dry period.

There is shown in FIG. 1 a water management system 10 that includes a rain gutter receptacle 12 which is mounted in a conventional manner, such as by bracket 14, to a building 16. A screen to filter bugs and other debris is mounted over gutter 12. A first conduit, including a downspout 18, is communicably connected to gutter 12. Downspout 18 extends downwardly beneath ground 20 and is communicably connected at its lower end with an underground reservoir tank 22. A seal 24 is formed about conduit 18 at the entrance to tank 22. Typically the upper surface of the tank is no greater than two feet below the surface so that the upper surface remains above the water table. The depictions shown in the drawings are for illustration only and are not drawn to proportion.

Tank 22 may have various shapes and sizes, which are not a limitation of this invention. Rather, the shape and size are dictated by the amount of water to be collected by the system and the capacity required to meet the expected irrigation needs of the system. The outer walls of the tank are constructed of various materials such as concrete, cement block, and various metal, plastic and/or fiberglass materials. The inside of tank 22 is lined by a vinyl liner 24 which may extend across all of the walls of tank 22 or, alternatively, only along the sides and bottom of the tank.

A pump 26 is supported by upper wall 28 of tank 22. Pump 26 is communicably interconnected with a second outlet conduit 30 that extends from tank 22. More particularly, pump 26 communicably interconnects sections 31 and 33 of outlet conduit 30. Section 31 extends downwardly into tank 22 and has an opening proximate the bottom of the tank. Outlet conduit section 33 extends upwardly from pump 26 to above ground level 20 and into a field 32. A dispensing mechanism such as a rotating sprayer 34 is attached at the end of conduit 30 within the field 32. Alternatively, pump 26 may be mounted above ground 20 so that operation of the pump can be more closely monitored. The pump can also be disposed at various other subterranean locations not on the upper surface of tank 22.

In certain embodiments a pipe 21 may be communicably connected to tank 22 proximate the bottom of the tank. Pipe 21 extends into an optional second tank 23 that is constructed similarly to tank 22. A conduit 25 extends from proximate the bottom of tank 23 to outlet conduit 30. A second pump 27 pumps water that collects in tank 23 through conduit 25 to outlet conduit 30. A water level testing pipe 29 is communicably connected to the tank 23 through the top of the tank. Pipe 29 extends upwardly above the ground. By introducing an indicating rod, level or measuring stick 41 through pipe 29, the level of the water in tank 23 is tested. A cap 45 may cover the top of pipe 29 when the depth indicator is not in use.

In operation, the water from rainfall or melted snow runs from roof 15 in the direction of arrow 40 into gutter 12. From there, the water is directed downwardly in the direction of arrow 42 through conduit 18 and into storage tanks 22 and 23. The collected water is maintained within tanks 22 and 23 below ground 20 so that evaporation of the collected water is kept to a minimum. Liner 24 prevents excessive leakage of the collected water 44 into the ground.

During the dry season or at other times when water 44 from tanks 22 and 23 is required for irrigating field 32, respective pumps 26 and 27 are activated, either manually or automatically, so that water 44 is drawn upwardly through conduit 25 from tank 23 in the direction of arrow 43 and through outlet conduit 30 from tank 22 in the direction of arrow 46. The water is then dispersed by rotating sprayer 34 about field 32.

Figure 2:
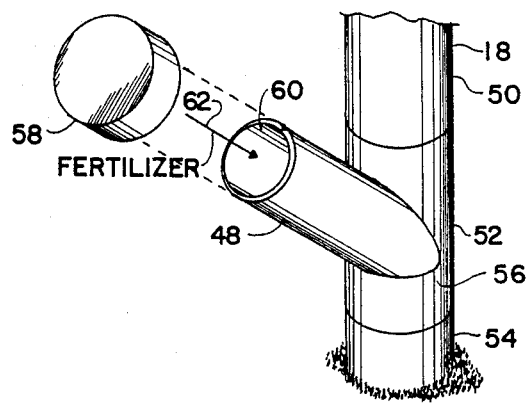
FIG. 2 is an isometric view of a portion of the first conduit means and the inlet for introducing fertilizer into the stored water.

An inlet 48 is provided proximate ground level 20 so that fertilizer may be introduced into the system. Inlet 48 is shown more clearly in FIG. 2. In particular, conduit 18 includes discrete sections of pipe, such as 50, 52 and 54 which may be attached by epoxy, cement or similar adhesive means. Inlet 48 has a tubular shape and is integrally and communicably connected with section 52 of conduit 18 so that inlet 48 and section 52 form a generally Y-shaped element 56. A cap 58 is provided for covering the opening 60 of inlet element 48. When the operator of system 10 desires to add fertilizer or various other agricultural nutrients to the water 44 in storage tank 22, he simply removes cap 58 and introduces the fertilizer as indicated by arrow 62. Cap 58 is then replaced over the inlet.

Figure 3:
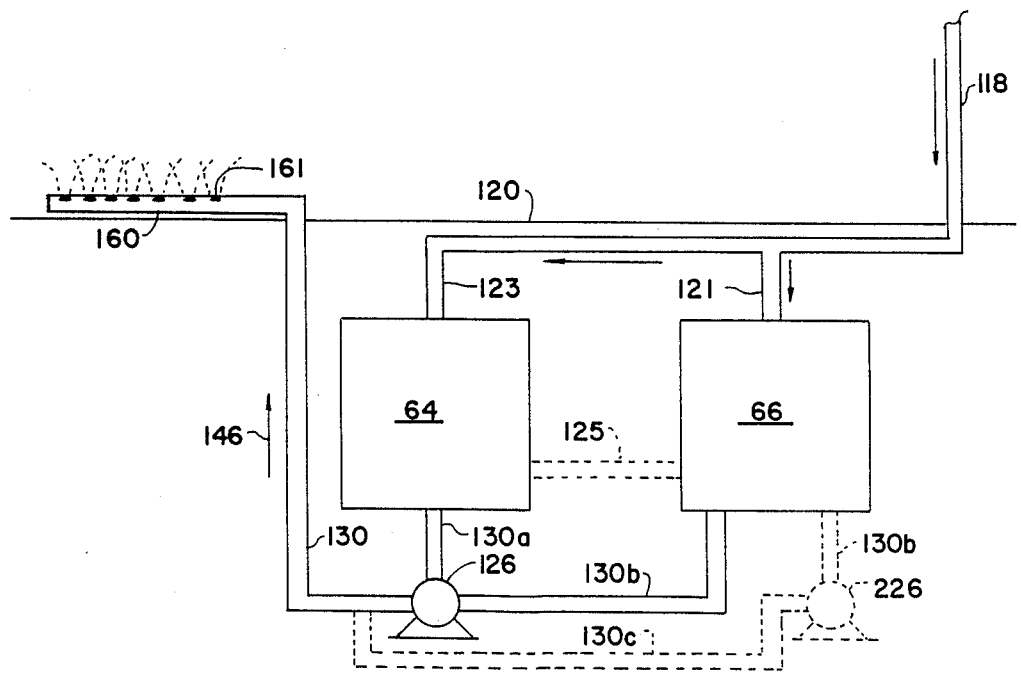
FIG. 3 is a schematic view of an alternative preferred embodiment of this invention.

In order to accommodate water from large amounts of rainfall or snowfall two or more tanks 22 and 23 may be used, although the invention may be practiced with a single tank. An alternative embodiment featuring two tanks 64 and 66 is shown in FIG. 3. Downspout conduit 118 extends beneath ground 120, via branches 121 and 123, and into tanks 66 and 64, respectively. Alternatively, conduit 118 may enter only one of the storage tanks, such as tank 66, and an overflow conduit 125 may be provided between the tanks 64 and 66. Each of the tanks may be constructed as previously described and may include a liner, not shown, for reducing leakage and evaporation.

Respective outlet conduits 130a and 130b extend from the bottoms of tanks 64 and 66, respectively. The stored water is pumped out of the tanks by a subterranean pump 126 that draws the water via outlet conduits 130a and 130b and directs that water through a single discharge conduit 130 in the direction of arrow 146.

The water is directed above ground 120 and is discharged as required through a linear sprayer apparatus 160 having multiple openings 161. Various alternative types of sprayers may also be attached to conduit 130.

In still further embodiments, an additional pump 226 may be connected by outlet conduit 130b to tank 66. Pump 226 pumps the stored water from tank 226 through conduit branch 130c to main discharge conduit 130. In still further embodiments, such as wherein the tanks 64 and 66 are connected by overflow conduit 125, only a single outlet conduit, for example conduit 130a, is required and a single pump 126 directs the stored water through that outlet conduit and through main discharge conduit 130 to the water dispensing system 160. By employing outlet conduits that are respectively engaged with the bottoms of the tanks, the outlet conduit is not required to extend the entire depth of the tank, as is required of section 31 in the embodiment of FIG. 1. However, it should be noted that in any of the embodiments disclosed herein, the pumps and outlet conduits may be engaged either with the upper wall of the tank, the side of the tank or the bottom of the tank.

Although specific features of the invention are shown in some of the drawings and not others, this is for convenience only, as each feature may be combined with any and all of the other features in accordance with this invention.

Other embodiments will occur to those skilled in the art and are within the scope of the following claims:

What is claimed is:

1. A water management system comprising; receptacle means mounted to the roof of a building for collecting water runoff from said roof;
   reservoir means disposed entirely underground and including permanently enclosed storage tank having fixed upper, lower and side walls that define a predetermined storage volume;
   first conduit means interconnecting said receptacle means and said reservoir means for conducting said water runoff from said receptacle means to said reservoir means for said storage therein;
   second conduit means connected to said reservoir means for forming an outlet therefrom;
   means for pumping stored water out of said reservoir means through said second conduit means; and
   means connected to said second conduit means downstream of said reservoir means and disposed above ground for dispensing the pumped water to irrigate a predetermined region.

2. The system of claim 1 in which said receptacle means include a rain gutter.

3. The system of claim 1 in which said reservoir means include liner means which extend across said walls of said storage tank to restrict leakage of the stored water from said reservoir means.

4. The system of claim 3 in which as liner means include at least one vinyl liner.

5. The system of claim 1 in which said means for pumping are supported by an upper wall of said tank.

6. The system of claim 1 in which said means for pumping are disposed generally below said tank.

7. The system of claim 1 in which said reservoir means include a plurality of tanks.

8. The system of claim 1 further including means for introducing fertilizer into the stored water.

9. The system of claim 8 in which said means for introducing include an inlet element that is attached to said first conduit means.

10. The system of claim 9 in which said first conduit means is formed from discrete conduit sections and said inlet element is integrally connected to one of said sections of said first conduit means at an angle such that said inlet element and said attached section of said first conduit means form a generally Y-shaped member.

11. The system of claim 1 further including means for detecting the depth of the water in said tank.

* * * * *